(12) United States Patent
Kranz

(10) Patent No.: US 6,992,468 B2
(45) Date of Patent: Jan. 31, 2006

(54) BOOST REGULATOR UTILIZING A DIGITAL CONTROLLER

(75) Inventor: Christian Kranz, Ratingen Lintorf (DE)

(73) Assignee: Infineon Technologies AG, Munich (DE)

(*) Notice: Subject to any disclaimer, the term of this patent is extended or adjusted under 35 U.S.C. 154(b) by 53 days.

(21) Appl. No.: 10/348,143

(22) Filed: Jan. 21, 2003

(65) Prior Publication Data

US 2003/0111989 A1 Jun. 19, 2003

Related U.S. Application Data

(63) Continuation of application No. PCT/DE01/02652, filed on Jul. 14, 2001.

(30) Foreign Application Priority Data

Jul. 20, 2000 (DE) .......................................... 100 35 418

(51) Int. Cl.
*G05F 1/44* (2006.01)

(52) U.S. Cl. ........................................ 323/283; 323/222
(58) Field of Classification Search ................ 323/283, 323/222, 284, 290
See application file for complete search history.

(56) References Cited

U.S. PATENT DOCUMENTS

| | | | | |
|---|---|---|---|---|
| 4,532,435 A | * | 7/1985 | Wood | |
| 4,761,725 A | * | 8/1988 | Henze | ............ 363/46 |
| 5,499,967 A | * | 3/1996 | Teillaud et al. | |
| 5,552,694 A | * | 9/1996 | Appeltans | |
| 5,801,935 A | * | 9/1998 | Sugden et al. | ............ 363/89 |
| 5,982,157 A | * | 11/1999 | Wattenhofer et al. | ....... 323/222 |
| 6,005,377 A | * | 12/1999 | Chen et al. | |
| 6,023,190 A | * | 2/2000 | Wada | |
| 6,448,745 B1 | * | 9/2002 | Killat | ............ 323/222 |

FOREIGN PATENT DOCUMENTS

| | | | |
|---|---|---|---|
| DE | 195 24 408 C2 | * | 1/1997 |
| DE | 19524408 | * | 1/1997 |
| JP | 57-040362 | | 3/1982 |
| JP | 58-170359 | | 10/1983 |
| JP | 03070464 A | * | 3/1991 |

OTHER PUBLICATIONS

Tang, P.T. et al.: "Design of DSP–Based Controller for Switching Power Converters", ☐☐IEEE TENCON—Digital Signal Processing Applications, Nov. 26, 1996, pp.☐☐889–894.*

Tietze, U. et al.: "Halbleiter–Schaltungstechnik" [Semiconductor Circuit Technology], ☐☐Springer, Ed. 11, Chapter 16.6, pp. 979–983–985.*

* cited by examiner

*Primary Examiner*—Shawn Riley
(74) *Attorney, Agent, or Firm*—Laurence A. Greenberg; Werner H. Stemer; Ralph E. Locher (57) ABSTRACT

A pulsed DC/DC voltage converter has a control loop operating digitally, apart from a digitization element. An output voltage is sampled during an off phase of the switching clock, resulting in a characteristic linear voltage profile. The output voltage is now readjusted in such a way that the linear voltage profile is divided by a reference voltage so that a specific fraction of the digitized voltage values is greater than the reference voltage, and the remainder is less than the reference voltage.

21 Claims, 4 Drawing Sheets

BOOST REGULATOR UTILIZING A DIGITAL CONTROLLER

CROSS-REFERENCE TO RELATED APPLICATIONS

This application is a continuation of copending International Application No. PCT/DE01/02652, filed Jul. 12, 2001, which designated the United States and was not published in English.

BACKGROUND OF THE INVENTION

Field of the Invention

The invention relates to a pulsed voltage converter and to a method for producing a control value for such a pulsed voltage converter.

A situation often arises in which a DC voltage source is available which supplies a voltage that is other than the voltage which is required. Pulsed DC/DC voltage converters are used to solve this problem, and convert the available voltage to the required voltage. Converters such as these each essentially contain three components, namely a power switch, an energy storage inductor and a smoothing capacitor. These components allow not only step-down converters (output voltage<input voltage) but also step-up converters (output voltage>input voltage) to be produced. The corresponding basic circuits are described in the standard work titled "Halbleiter-Schaltungstechnik" [Semiconductor Circuit Technology] by U. Tietze and Ch. Schenk, 11th Edition (Springer), in Chapter 16.6 (pages 979 et seqq.).

In order to make it possible to produce a controllable DC/DC converter, the power switch must be driven by a square-wave signal whose duty ratio can be readjusted. An analog pulse width modulator, which contains a sawtooth waveform generator and a comparator, may be used to produce such a square-wave signal. The comparator is now supplied first with the triangular waveform voltage produced by the sawtooth waveform generator and second with a control signal that is derived from the output voltage. The comparator switches the switch on for as long as the control signal is greater than the triangular waveform voltage. As soon as the control signal falls below the triangular waveform voltage, the power switch is switched off. This results in a duty ratio that is proportional to the control signal.

A complete implementation of a step-down converter using an analog pulse width modulator is described on pages 983 to 985 of the book titled "Halbleiter-Schaltungstechnik" [Semiconductor Circuit Technology] (11th Edition), as mentioned above, by Tietze/Schenk.

Control circuits that are constructed on an analog basis have the disadvantage that their integration in CMOS circuits is complex, since the analog circuit components are configured from the standardized CMOS circuit design. Furthermore, digital circuits with extensive analog circuit components are known for the large amount of chip surface area that they occupy. For this reason, it would be desirable to be able to replace as great a proportion of the analog circuit components as possible by digital circuits with the same functionality.

U.S. Pat. No. 6,005,377 describes a voltage converter in which the output voltage is digitized by an A/D converter. The digital signal is passed to a comparator, which compares the digital signal with a reference signal in order to produce an error signal. The error signal is filtered and is used for producing a control value for switching time adjustment.

U.S. Pat. No. 5,552,694 discloses a voltage converter, in which the output voltage is intended to be within a limited voltage value range that can be predetermined. If the output voltage is outside the voltage value range, the times for which the control transistors are switched on and off are controlled such that the output voltage returns to within the voltage value interval.

SUMMARY OF THE INVENTION

It is accordingly an object of the invention to provide a completely digital voltage converter that overcomes the abovementioned disadvantages of the prior art devices of this general type, which is configured such that it largely avoids the use of analog components and in which a control value is used which is particularly suitable for digital control circuits.

With the foregoing and other objects in view there is provided, in accordance with the invention, a pulsed voltage converter. The converter contains an energy storage inductor, and a switching element connected to the energy storage inductor and driven by a switching clock. The switching element connects the energy storage inductor to an input voltage and disconnects the energy storage inductor from the input voltage, in accordance with the switching clock. A diode has a first terminal connected to the energy storage inductor and to the switching element, and a second terminal where an output voltage can be tapped off. A digitization unit supplies a digital signal representative of a magnitude of the output voltage and is connected to the second terminal of the diode. A digital control circuit is connected to the digitization unit and utilizes a sampling clock for reading the digital signal supplied from the digitization unit resulting in digital signal values. A frequency of the sampling clock is higher than a frequency of the switching clock. The digital control circuit generates a control value from the digital signal values. The digital control circuit has a switching clock generator connected to the switching element and produces the switching clock for driving the switching element. A duty ratio and/or the frequency of the switching clock being influenced by the control value.

The pulsed voltage converter according to the invention has, inter alia, a digitization unit that supplies a digital signal that is representative of the magnitude of the output voltage. The digital signal that is provided by the digitization unit is read by the digital control circuit using a sampling clock whose frequency is higher than the frequency of the switching clock.

In the solution according to the invention, the output voltage is thus digitized at the earliest possible time, and, for this reason, all the control loop components—with the exception of the digitization unit itself—can be configured using digital technology. This results in that the entire digital control circuit as well as the clock generator can advantageously be included in the CMOS design. This allows a smaller and lower-cost embodiment of the control circuit.

The digital signal that is supplied from the digitization unit is read using a sampling clock whose frequency is higher than the frequency of the switching clock. A large number of digital signal values can thus be recorded in each switching clock cycle. Therefore, it is possible to record the output voltage, and to use this for determining the control value, not only at specific points but over its entire profile. This allows the control value to be matched very precisely to the voltage conditions that exist at the converter output. The determined control value is then used to adjust the duty ratio of the square-wave signal that is used to drive the switching element.

According to one advantageous embodiment of the invention, the digital signal that is supplied from the digitization unit is read only during the off phase of the switching clock. During the on phase of the switching clock, the switching element is in the switched-on state, the induction coil is connected to the supply voltage and a current builds up through the coil. During the off phase of the switching clock, on the other hand, the switching element is switched off, and the stored current flows through the diode into the output capacitor and into the connected load. The current flow results in an increase in the output voltage during the off phase. For this reason, the profile of the output voltage during the off phase of the switching clock is particularly suitable for determining the controlled variable.

According to a further advantageous embodiment of the invention the control value is generated and the duty ratio and/or the clock frequency of the switching clock are/is controlled such that a predetermined fraction of the digital signal values which are read during the off phase of the switching clock represents output voltages greater than the reference voltage, and in that the remaining portion of the digital signal values which are read during the off phase of the switching clock represents output voltages less than the reference voltage.

In this embodiment of the invention, the output voltage is thus in each case readjusted such that a predetermined portion of the output voltage profile is greater than the reference voltage and the remaining portion is less than the reference voltage. A control process such as this, which takes account of the entire voltage profile, allows a robust, disturbance-free control response. Individual "spurious values" among the digital signal values have only an insignificant adverse effect on the control response.

In particular, it is advantageous for half of the digital signal values that are read during the off phase of the switching clock to represent output voltages greater than the reference voltage. The output voltage profile is thus readjusted such that the number of voltage values greater than the reference voltage is equal to the number of voltage values less than the reference voltage. The reference voltage then corresponds approximately to the mean value of the voltage profile that is produced during the off phase of the switching clock.

It is advantageous for the digitization unit to be a comparator circuit that compares the output voltage with a reference voltage. A comparator circuit represents the simplest and lowest-cost embodiment of a digitization unit. This minimizes the analog circuit complexity.

It is advantageous for the comparator circuit to supply a first digital signal value when the output voltage is greater than the reference voltage, and to supply a second digital signal value when the output voltage is less than the reference voltage. The digital information as to whether the output voltage is or is not greater than the reference value is thus in each case produced at the output of the comparator circuit. This information reduced to one bit is, however, sufficient for many control purposes. The profile of the output voltage can still be followed to such an extent that the time at which the reference voltage is undershot can be read from the digital signal values.

According to one alternative embodiment of the invention, the digitization unit is an analog/digital converter. An A/D converter supplies a digital signal that is representative of the magnitude of the output voltage and has a length of more than one bit. This allows more accurate recording of the output voltage profile. Furthermore, when using an A/D converter, it is possible to take account of the reference voltage in computational terms. The reference voltage therefore need not be provided as an actual voltage.

It is advantageous for the digital control circuit to have a counter whose count is incremented for each digital signal value which is read during the off phase of the switching clock and which represents an output voltage greater than the reference voltage, and its count is decremented for each digital signal value which is read during the off phase of the switching clock and which represents an output voltage less than the reference voltage.

The counter counts upward or downward by one for each digital signal value that occurs, with the counting direction being governed by the output of the digitization unit. A counter such as this makes it easily possible to determine the difference between the digital signal values that are greater than and less than the reference voltage.

If a positive count is produced at the end of the off phase of the switching clock, then the number of output voltages recorded that are greater than the reference voltage is greater than the number of output voltages recorded that are less than the reference voltage. This in turn results in that the output voltage on average is too high and must be regulated downward. If, on the other hand, a negative count is present after the off phase of the switching clock, then the mean output voltage must be raised.

It is advantageous to use the count which is present after each off phase of the switching clock cycle to determine the control value at that time, with a positive count influencing the control value such that the on phase of the switching clock is shortened, and with a negative count influencing the control value such that the on phase of the switching clock is lengthened.

If the count is positive, the aim of the control process must be to reduce the mean output voltage. To do this, the duty ratio of the switching clock is varied such that the on phase is shortened. Therefore, the induction coil is not connected to the supply voltage for as long, and only a small current flow can develop through the inductor during the short time period. The contribution of the inductor current to the output voltage is therefore also reduced, and the output voltage falls.

Conversely, a negative count indicates that the output voltage is too low on average. In this case, the on phase of the switching clock must therefore be lengthened in order to produce a higher output voltage.

It is advantageous to allow the off phase of the switching clock to be varied only as far as a predetermined upper limit.

The upper limit should therefore not be exceeded since the required switched-on duration then becomes shorter than the minimum switched-on duration $T_{min}$ that the switching element can produce. In this situation, the output voltage rises after a switch-on pulse $T_{min}$ to such an extent that the transistor is then switched off for a number of cycles. This results in very unsteady operation.

In a corresponding manner, it is advantageous for only variations of the off phase of the switching clock as far as a predetermined lower limit to be allowed, since, otherwise, this would result in the minimum time for which a transistor can be switched off being undershot.

According to a further advantageous refinement of the invention, the switching clock rate is a multiple of the sampling clock rate. The sampling clock is used for reading the output of the digitization unit. The higher the sampling frequency, the greater is the number of digital signal values recorded. The profile of the output voltage can thus be accurately recorded and taken into account in the control process.

In particular, it is advantageous to produce the frequency of the switching clock by a frequency divider from the higher sampling frequency. Therefore, the voltage converter needs to be supplied only with the sampling frequency, with the voltage converter then itself producing the frequency for the switching clock. This also has the advantage that the switching clock and the sampling clock are synchronized to one another.

According to a further advantageous embodiment of the invention, a digital signal is generated which is representative of the magnitude of the inductor current. The digital signal is supplied to the digital control circuit and is taken into account when determining the control value. In this case, in particular, the important factor for the control process is whether the energy storage inductor current does (discontinuous operation) or does not (continuous operation) fall to zero during the off phase.

Another advantageous refinement provides for the digital signal to be generated that is representative of the magnitude of the input voltage and allows the control circuit to be matched to different input voltages.

A further embodiment of the invention provides a digital signal in order to distinguish between discontinuous and continuous operation, which is supplied to the digital control circuit and is taken into account when determining the control value. Discontinuous operation occurs when the connected load consumes only a small amount of power. In this case, the coil current falls to zero during the off phase of the switching clock and then no longer contributes to the output voltage. During discontinuous operation a large proportion of the output voltage values is less than the reference voltage. The output voltage during discontinuous operation thus has a tendency to be regulated at excessively high values. The digital signal for distinguishing between discontinuous and continuous operation is used to avoid this incorrect control response.

In the method according to the invention for producing a control value for a pulsed voltage converter, the output voltage of the voltage converter is first read using a sampling clock whose frequency is higher than the frequency of the switching clock of the voltage converter. A control value is then produced by evaluation of the voltage values obtained during the sampling process. For example, in the course of the evaluation process, it is possible to determine how many of the voltage values read during the off phase of the switching clock are greater than or less than a reference value. In the next step, the switching clock is produced, with the duty ratio and/or the clock frequency of the switching clock being influenced by the control value. The duty ratio and/or the clock frequency of the switching clock are/is then preferably readjusted such that a predetermined fraction of the output voltages which are read during the off phase has voltage values greater than the reference voltage, and such that the remaining portion has voltage values less than the reference voltage.

In the case of pulsed voltage converters, there is a linear drop in the output voltage during the off phase of the switching clock, which can advantageously be used for voltage regulation. In order to allow this profile to be recorded sufficiently accurately, a sufficiently large number of samples must be recorded.

A statement must then be made of the relative location of the voltage profile, as determined during the off phase, with respect to the reference voltage. For this purpose, a determination is made of how many of the voltage values that describe the falling voltage profile during $T_{off}$ are greater than or less than the reference voltage. The aim of the control process is to change the profile of the output voltage to a specific position relative to the reference voltage. The relative position can be described in that a specific fraction of the voltage values recorded during $T_{off}$ is greater than the reference voltage and the remainder is less than the reference voltage. If too many output voltage values are greater than the reference voltage than the mean output voltage must be corrected downward. This allows a suitable control value to be produced, which allows robust control of the output voltage, with few disturbances.

Other features which are considered as characteristic for the invention are set forth in the appended claims.

Although the invention is illustrated and described herein as embodied in a completely digital voltage converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
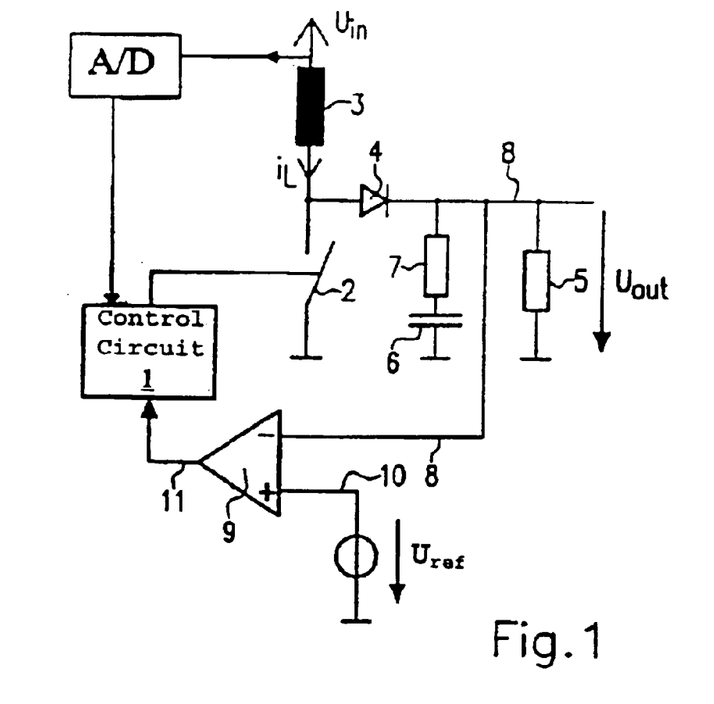
FIG. 1 is a circuit diagram of an embodiment of a voltage converter in which a comparator is used as a digitization unit according to the invention.

Referring now to the figures of the drawing in detail and first, particularly, to FIG. 1 thereof, there is shown a circuit diagram of a pulsed DC/DC voltage converter, which converts an input voltage $U_{in}$ to an output voltage $U_{out}$. The illustrated voltage converter is a step-up voltage converter, in which the input voltage $U_{in}$ is less than the output voltage $U_{out}$. The voltage control process according to the invention may, however, also be used for step-down converters where $U_{in} > U_{out}$.

The switching clock signal for the voltage converter is produced by a digital control circuit 1, and is used for driving a switching element 2. The switching element 2 may be a power transistor, for example a MOSFET.

When the square-wave switching clock signal is in the on phase $T_{on}$, the switching element 2 is switched on (closed, conducting), and the energy storage inductor 3 is thus connected to the input voltage $U_{in}$. Once the switching element 2 is closed, a current $i_L$ which increases with time builds up through the energy storage inductor 3. In this case, a diode 4 prevents current from flowing back out of a capacitor 6. The longer the on phase $T_{on}$ of the switching signal, the higher is the current flow through the energy storage inductor 3.

When the switching signal changes to the off phase $T_{off}$, the switching element 2 is off (opened, non-conducting), and the stored current $i_L$ flows through the diode 4 both into a connected load 5 and into the capacitor 6. A resistance 7 in this case represents the series resistance of the capacitor 6. As long as a load current is less than the current $i_L$ flowing through the energy storage inductor 3, the remaining current charges the capacitor 6, and the output voltage $U_{out}$ rises. During the on phase $T_{on}$, the current $i_L$ flowing through the energy storage inductor 3 decays, and this also leads to a drop in the output voltage. From the start of the next on phase of the switching clock, the energy storage inductor 3 is once again newly charged with current. During this clock phase, the charged capacitor 6 is used as a current source for the load 5.

The longer the switched-on phase of the switching element 2 lasts, the higher is the current $i_L$ flowing through the energy storage inductor 3, and the higher is the output voltage $U_{out}$ as well. The output voltage can thus be regulated via the duty ratio of the switching clock signal. For this purpose, an output voltage signal 8 is supplied to an inverting input of a comparator 9. The comparator 9 is the only analog component in the control loop of the pulsed voltage converter. A desired reference voltage 10 is applied to a non-inverting input of the comparator 9. The two voltages $U_{out}$ and $U_{ref}$ are compared by the comparator 9. If the output voltage $U_{out}$ is greater than the reference voltage $U_{ref}$, then a comparator output 11 is at a first digital signal value. When $U_{out} < U_{ref}$ on the other hand, a second digital signal value appears at the comparator output 11.

The comparator output 11 is read a number of times in each switching clock cycle by the digital control circuit 1. The sampling frequency is preferably a multiple of the switching frequency.

The digital control circuit 1 uses the digital signal values that are read to determine whether the output voltage does or does not need to be readjusted, and the direction in which the readjustment must be carried out. The profile of the output voltage during the off phase of the switching clock is particularly important for this purpose. It is therefore also sufficient to sample the comparator output 11 only during the off phase of the switching clock.

If too many output voltage values are less than the reference voltage, the switching clock signal that is produced by the digital control circuit 1 is varied such that the duration of the switched-on phase increases relative to the switched-off phase. This change in the duty ratio increases the current flow through the energy storage inductor 3, and the mean output voltage rises.

If, on the other hand, the evaluation of the digital signal values which are tapped off at the comparator output 11 shows that the mean output voltage is too high, then the switched-on phase of the switching clock is shortened by the digital control circuit 1. The output voltage is thus regulated primarily via the duty ratio of the square-wave signal that is used for driving the switching element 2. In addition it is also possible to vary the clock frequency of the switching clock signal.

Figure 2:
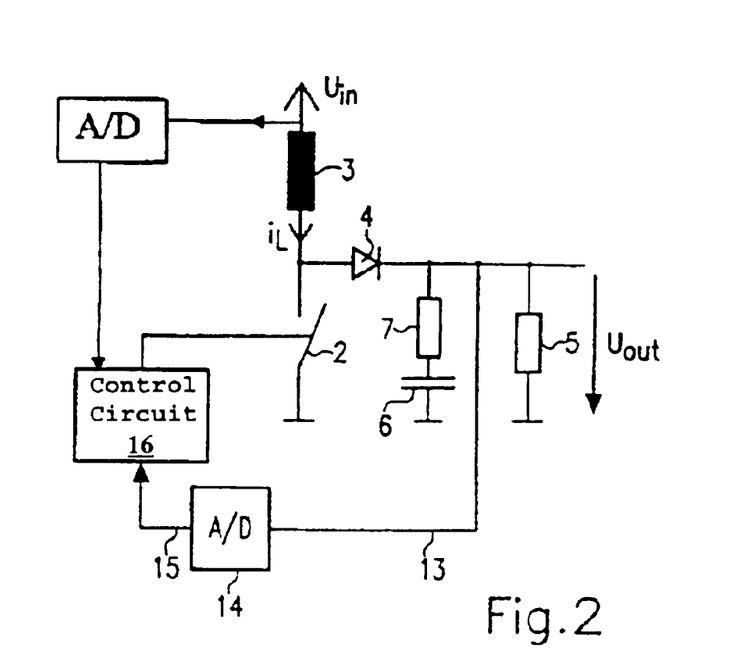
FIG. 2 is a circuit diagram of a further embodiment in which an analog/digital converter is used as the digitization unit.

FIG. 2 shows a circuit variant in which the output voltage can be recorded more accurately. To do this, an output voltage signal 13 is supplied to an analog/digital converter 14, which converts the analog signal to a digital signal 15 with a length of more than one bit. The digital signal 15 can then be sampled by a digital control circuit 16, and may be used as the basis for the rest of the control process. This allows the profile of the output voltage to be recorded more accurately. A further advantage is that the comparison of the digital signal 15 with the reference voltage can be carried out by calculation, and the reference voltage therefore need not actually be made available.

Figure 3A:
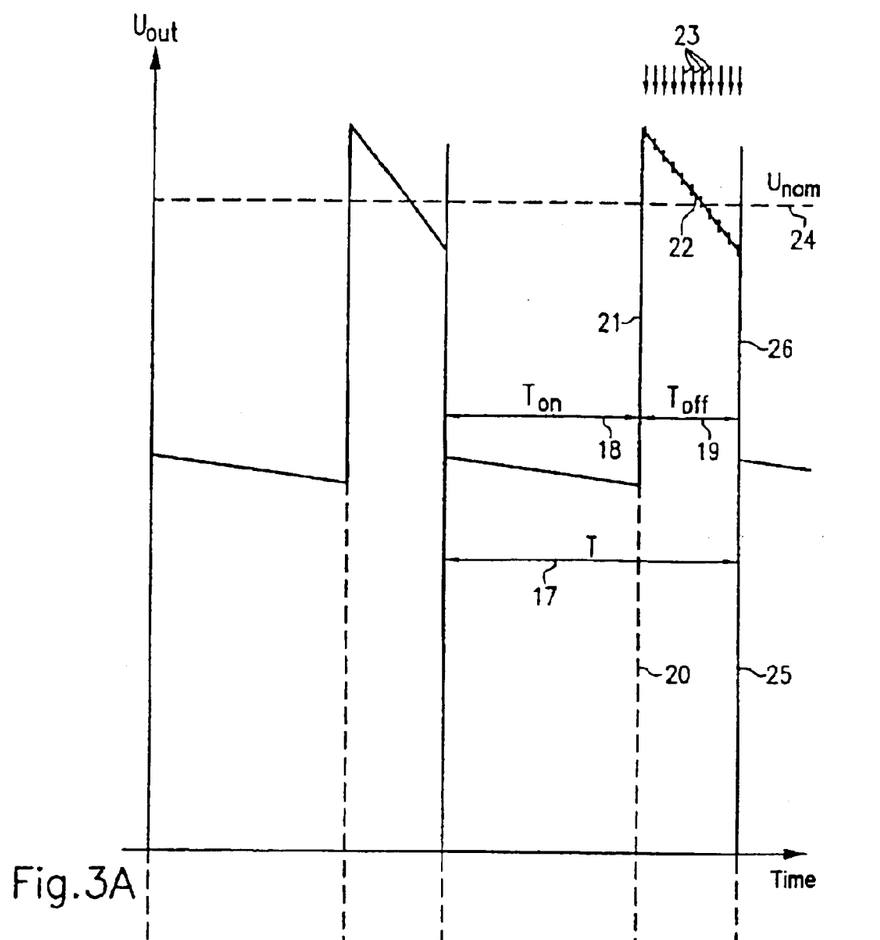
FIG. 3A is a graph illustrating a time profile of the output voltage for continuous operation.
Figure 3B:
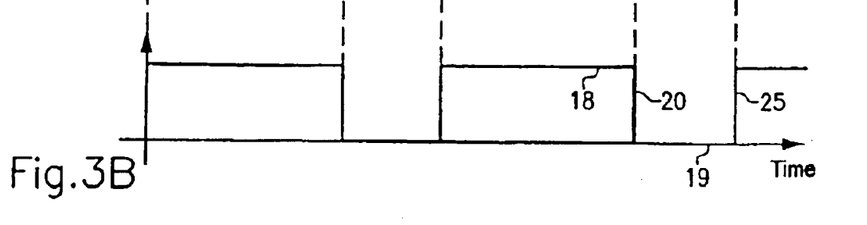
FIG. 3B is a graph illustrating an associated time profile of the switching clock signal which is used for driving the power transistor.

If the current drawn by the connected load is greater than a certain minimum current level, this results in the output voltage $U_{out}$ having the time profile illustrated in FIG. 3A. FIG. 3B shows the profile of the associated switching clock signal. The switching clock signal is a square-wave signal whose period is T(17). During the on phase 18 of the switching clock signal, the switching element 2 is switched on (closed). The coil current $i_L$ thus makes no contribution to the load current during the period $T_{on}$ of the on phase 18. During $T_{on}$ the capacitor 6 is used as a current source for the load 5. The slight reduction in the output voltage $U_{out}$ during $T_{on}$ is thus caused by the discharging of the capacitor 6.

At time 20 at which switching-off occurs, the switching clock signal changes from the on phase 18 to the off phase 19. The switching element 2 is switched off during the period $T_{off}$ of the off phase 19. The coil current $i_L$ flows via the diode 4 into the load 5 and, furthermore, the capacitor 6 is charged. As can be seen in FIG. 3A, the current flow $i_L$ after the switching time 20 results in a sudden rise 21 in the output voltage $U_{out}$. During the time period $T_{off}$ the current $i_L$ through the energy storage inductor 3 decreases continuously, which leads to a characteristic linear drop 22 in the output voltage $U_{out}$ during the off phase 19 of the switching clock signal.

The linear drop 22 in the output voltage is particularly highly suitable for deriving from it a controlled variable for the voltage regulation. To do this, the output voltage is read by sampling pulses 23 corresponding to the sampling frequency during the off phase 19, and is converted to digital signal values. The relative position of the linear drop 22 with respect to the reference voltage 24 can be determined from this sequence of digital signal values.

The aim is to readjust the output voltage such that the linear voltage profile is in a defined position relative to the reference voltage 24. A portion of the sampled output voltage values should therefore be greater than $U_{ref}$ and the remaining portion should be less than $U_{ref}$. If too many of the sampled voltage values are greater than $U_{ref}$, the on phase 18 ($T_{on}$) of the switching clock signal must be shortened. If, on the other hand, the mean output voltage during $T_{off}$ is too low, the on phase 18 must be lengthened.

At the time 25 of switching on, the switching element 2 is switched on again, and, after this time, the coil current no longer contributes to the load current. This results in a sudden drop 26 in the output voltage.

Figure 4A:
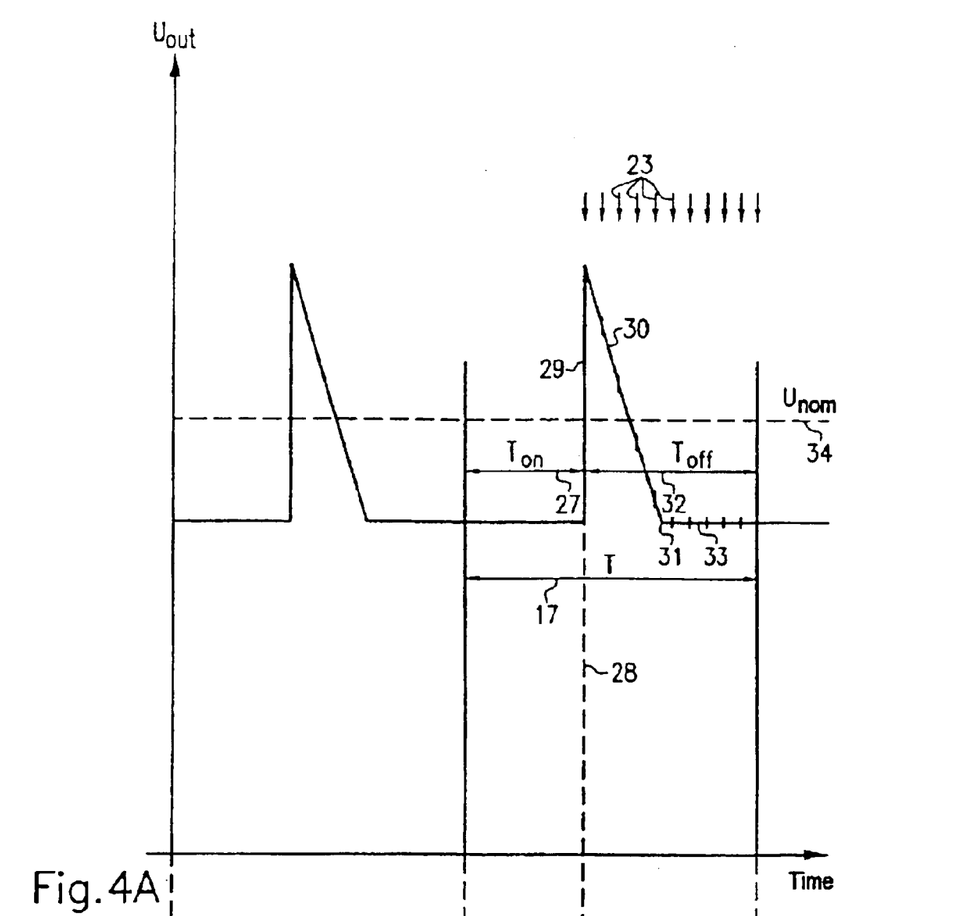
FIG. 4A is a graph illustrating the time profile of the output voltage for low load currents (noncontinuous operation)
Figure 4B:
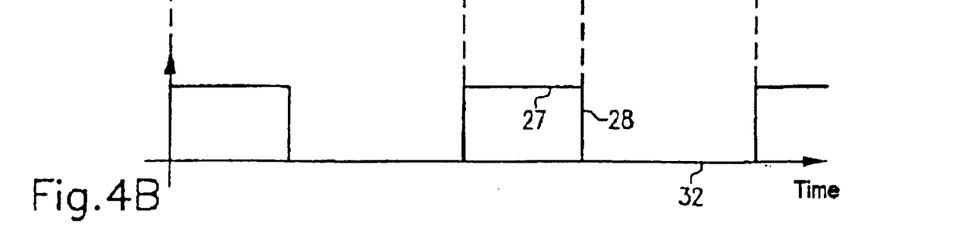
FIG. 4B is a graph illustrating the associated time profile of the switching clock signal.

FIGS. 4A and 4B show the time profile of the output voltage $U_{out}$ and of the switching clock signal for the situation where the load current is low. Owing to the small amount of current drawn by the load, the energy storage inductor 3 is connected to the input voltage $U_{in}$ for only a short time during each switching clock cycle. During the period $T_{on}$ of the on phase 27, only a small current flow $i_L$ therefore builds up through the energy storage inductor 3.

When the switching element 2 is switched off at the switching-off time 28, this once again initially results in a sudden rise 29 in the output voltage $U_{out}$. The current that is stored in the coil flows into the load 5 and into the capacitor 6 within a short time. This therefore initially results in a linear drop 30 in the output voltage. At the time 31, that is to say still during the off phase 32 of the switching clock signal, the coil current has already decayed to zero. After the time 31, the load 5 is supplied with current from the capacitor 6. Since the load 5 draws only a small amount of current, this results in a region 33 with a constant output voltage profile in the remaining part of the off phase 32.

This operating mode, which is typical for low load currents, is referred to as "discontinuous operation". Even in the case of discontinuous operation, the output voltage should be readjusted such that the linear voltage profile 30 is located in a defined position with respect to the reference voltage 34. However, if all the voltage values read during $T_{off}$ are taken into account in the control process, the region 33 results in the number of voltage values which are less than the reference voltage predominating even when the output voltage has already been appropriately regulated. The output voltage is therefore raised to excessively high values.

In order to prevent this, it would be necessary to provide a detector to identify the presence of discontinuous operation, for example by measuring the coil current $i_L$. This could be achieved, for example, by measuring the voltage drop across a measurement resistor connected in series with the energy storage inductor 3. In this way, it is possible to identify the time 31 at which the coil current has fallen to zero. In order to provide sensible control for the discontinuous operation situation, only the digital signal values between the switching-off time 28 and the time 31 are taken into account.

Figure 5:
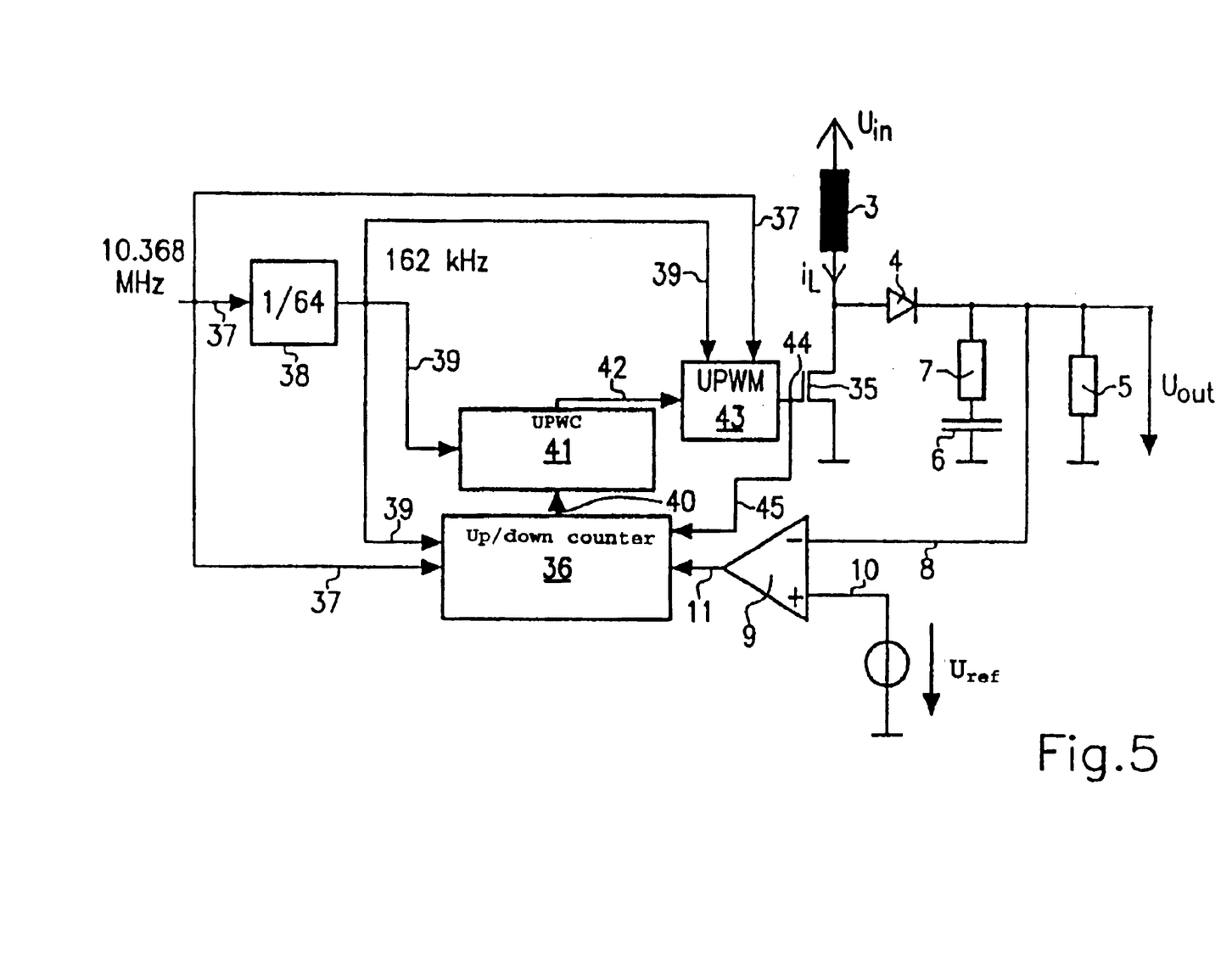
FIG. 5 is a block circuit diagram of the digital control circuit according to the invention.

FIG. 5 shows a circuit diagram for one specific implementation of the digital control circuit 1. The voltage converter circuit itself in this case corresponds to the circuit shown in FIG. 1, with a switching FET 35 being used as the switching element 2.

The comparator 9 is provided as the digitization unit for conversion of the analog output voltage signal 8 to a digitized signal, and carries out a comparison between the output voltage signal 8 and the reference voltage 10.

If the output voltage is greater than the reference voltage, a first digital signal value appears at the comparator output 11. If, on the other hand, the output voltage is less than the reference voltage, then the comparator 9 supplies a second digital signal value. The comparator output 11 is read by an up/down counter 36 during each off phase $T_{off}$ at a sampling frequency 37. A sampling frequency of 10.368 MHz is used in the illustrated example.

Whenever the first digital signal value is read from the comparator output 11, the count is incremented by one. The count is decremented by one whenever the second digital signal value is read. The count which is present at the end of the off phase of the switching clock cycle thus indicates the difference between the number of first digital signal values which have been read and the number of second digital signal values which have been read. If the majority of the output voltage values which are recorded during the off phase of the switching clock are greater than the reference voltage, then this results in a positive count at the end of the off phase. On the other hand, if the mean output voltage is too low, then the count becomes negative.

In the illustrated implementation, the fundamental frequency 39 is obtained from the sampling frequency 37 by frequency division. The sampling frequency 37 is in this case 10.368 MHz and is divided by a factor of 64 by the frequency divider 38, thus resulting in a fundamental frequency 39 of 162 kHz.

The fundamental frequency 39 is supplied to the up/down counter 36 and triggers a transmission 40 of the count cnt to the unit for pulse width calculation 41. The reading of the count and the calculation of the pulse width pw(k) which is applicable for the new cycle in this case each take place at the start of one cycle of the fundamental frequency 39. The pulse width pw(k) in this case indicates the length of the on phase of the switching clock signal. If the count cnt is positive, the pulse width pw(k) must be reduced in comparison to pw(k-1). Conversely, the pulse width pw(k) must be increased if the count is negative.

The pulse width pw(k) which is applicable to the new cycle is calculated in the unit for pulse width calculation 41 using the following formula:

$$pw(k) = pw(k-1) + \frac{kr * cnt}{64 * (1 - pw(k-1))}$$

By way of example, a sensible value for kr is kr=−0.15. The count cnt is normalized with respect to the time $T_{off}$ by means of the factor $$\frac{1}{64 \cdot (1 - pw(k-1))}$$

so that it is independent of the pulse width. Based on the fundamental frequency 39, the calculated pulse width pw(k) 42 is transmitted to a pulse width generator 43 (UPWM, Universal Pulse Width Modulator). The pulse width generator 43 uses the pulse width pw(k), the fundamental frequency 39 (162 kHz) and the sampling frequency 37 to produce the switching clock signal 44. The switching clock signal 44 is equal to 1 during the time period $$\frac{pw(k)}{162 \text{ kHz}}$$

and is equal to 0 for the rest of the cycle.

The switching clock signal 44 produced in this way is used for driving the switching FET 35; and the falling edge of the switching clock signal 44 is also used to reset 45 the count of the up/down counter 36.

I claim:

1. A pulsed voltage converter, comprising:
   an energy storage inductor;
   a switching element connected to said energy storage inductor and driven by a switching clock, said switching element connecting said energy storage inductor to an input voltage and disconnecting said energy storage inductor from the input voltage, in accordance with the switching clock;
   a diode having a first terminal connected to said energy storage inductor and to said switching element, and a second terminal where an output voltage can be tapped off;
   a digitization unit supplying a digital signal representative of a magnitude of the output voltage and connected to said second terminal of said diode; and
   a digital control circuit connected to said digitization unit and utilizing a sampling clock for reading the digital signal supplied from said digitization unit resulting in digital signal values, a frequency of the sampling clock being higher than a frequency of the switching clock, said digital control circuit generating a control value from the digital signal values, said digital control circuit having a switching clock generator connected to said switching element and producing the switching clock for driving said switching element, at least one of a duty ratio and the frequency of the switching clock being influenced by the control value, said digital control circuit further having a counter whose count is incremented for each of the digital signal values read during an off phase of the switching clock that have an output voltage greater than a reference voltage, and the count is decremented for each of the digital signal values read during the off phase of the switching clock that have an output voltage less than the reference voltage.

2. The pulsed voltage converter according to claim 1, wherein the digital signal supplied by said digitization unit is read only during the off phase of the switching clock, during the off phase said switching element is in a switched-off state.

3. The pulsed voltage converter according to claim 1, wherein the control value is generated such that at least one of the duty ratio and the frequency of the switching clock is controlled such that a predetermined fraction of the digital signal values read during the off phase of the switching clock have output voltages greater than the reference voltage, and a remaining portion of the digital signal values read during the off phase of the switching clock have output voltages less than the reference voltage.

4. The pulsed voltage converter according to claim 3, wherein the control value is generated such that at least one of the duty ratio and the frequency of the switching clock is controlled such that half of the digital signal values read during the off phase of the switching clock have output voltages greater than the reference voltage, and the other half of the digital signal values read during the off phase of the switching clock have output voltages less than the reference voltage.

5. The pulsed voltage converter according to claim 1, wherein
said digitization unit is a comparator circuit comparing the output voltage with the reference voltage.

6. The pulsed voltage converter according to claim 5, wherein said comparator circuit supplies a first digital signal value when the output voltage is greater than the reference voltage, and supplies a second digital signal value when the output voltage is less than the reference voltage.

7. The pulsed voltage converter according to claim 1, wherein said digitization unit is an analog/digital converter.

8. The pulsed voltage converter according to claim 1, wherein the count present after the off phase in a switching clock cycle is used to define the control value at that time, with a positive count influencing the control value such that an on phase of the switching clock is shortened, and with a negative count influencing the control value such that the on phase of the switching clock is lengthened.

9. The pulsed voltage converter according to claim 1, wherein said counter is reset to zero one of before a start and at a start of the off phase of the switching clock.

10. The pulsed voltage converter according to claim 1, wherein the off phase of the switching clock is varied only as far as a predetermined upper limit.

11. The pulsed voltage converter according to claim 1, wherein the off phase of the switching clock is varied only as far as a predetermined lower limit.

12. The pulsed voltage converter according to claim 1, wherein a rate of the switching clock is a multiple of a rate of the sampling clock.

13. The pulsed voltage converter according to claim 12, wherein said digital control circuit has a frequency divider receiving the sampling clock and the frequency of the switching clock being produced by said frequency divider from a higher frequency of the sampling clock.

14. The pulsed voltage converter according to claim 1, wherein the digital signal is representative of a magnitude of an energy storage inductor current, the digital signal is supplied to said digital control circuit and is taken into account when defining the control value.

15. The pulsed voltage converter according to claim 1, wherein a further digital signal is representative of a magnitude of the input voltage, the further digital signal is supplied to said digital control circuit and is taken into account when defining the control value.

16. The pulsed voltage converter according to claim 1, wherein the digital signal is generated to distinguish between a discontinuous operation and a continuous operation, the digital signal is supplied to said digital control circuit and is taken into account when defining the control value.

17. A method for producing a control value for a pulsed voltage converter, which comprises the steps of:
sampling an output voltage of the pulsed voltage converter using a sampling clock having a frequency higher than a frequency of a switching clock of the pulsed voltage converter;
generating the control value by evaluating voltage values obtained during the sampling by the steps of:
determining a number of the voltage values read during an off phase of the switching clock being greater than or less than a reference voltage;
using a counter having a count incremented for each of the voltage values read during the off phase of the switching clock that have a voltage greater than the reference voltage, and the count being decremented for each of the voltage values read during the off phase of the switching clock that have a voltage less than the reference voltage; and
producing the switching clock in which at least one of a duty ratio and the frequency of the switching clock being influenced by the control value.

18. The method according to claim 17, wherein the producing step comprises deriving the control value for readjustment of at least one of the duty ratio and the frequency of the switching clock such that a predetermined fraction of the voltage values read during the off phase have voltages greater than the reference voltage, and a remaining portion of the voltage values read during the off phase of the switching clock have voltages less than the reference voltage.

19. The method according to claim 18, which comprises setting the control value to readjust at least one of the duty ratio and the frequency of the switching clock such that half of the voltage values read during the off phase have voltages greater than the reference voltage, and that the other half of the voltage values read during the off phase of the switching clock have voltages less than the reference voltage.

20. The method according to claim 17, which comprises forming a rate of the switching clock to be a multiple of a rate of the sampling clock.

21. The method according to claim 20, which comprises producing the frequency of the switching clock using a frequency divider from the higher frequency of the sampling clock.

* * * * *